United States Patent [19]
Johnson

[11] Patent Number: 5,964,001
[45] Date of Patent: Oct. 12, 1999

[54] AIR DOME HOSE

[75] Inventor: Troy A. Johnson, Newton, Iowa

[73] Assignee: Maytag Corporation, Newton, Iowa

[21] Appl. No.: 08/990,329

[22] Filed: Dec. 15, 1997

[51] Int. Cl.$^6$ .................................................. D06F 33/02
[52] U.S. Cl. ............................ 8/158; 68/12.02; 68/12.05; 68/12.21; 8/159
[58] Field of Search ................. 8/158, 159; 69/12.02, 69/12.04, 12.05, 12.21, 207; 137/387

[56] References Cited

U.S. PATENT DOCUMENTS

| | | | |
|---|---|---|---|
| 3,038,639 | 6/1962 | Anderson | 68/207 |
| 3,375,686 | 4/1968 | Palmer | 68/12.05 |
| 3,385,085 | 5/1968 | Engel . | |
| 3,397,716 | 8/1968 | Andersson . | |
| 3,918,457 | 11/1975 | Racenis . | |
| 4,066,094 | 1/1978 | Stitch . | |
| 4,699,293 | 10/1987 | Knoop | 8/159 |
| 4,711,103 | 12/1987 | Mori et al. . | |
| 4,835,991 | 6/1989 | Knoop et al. | 68/207 |
| 5,335,524 | 8/1994 | Sakane . | |

FOREIGN PATENT DOCUMENTS

| | | | |
|---|---|---|---|
| 243727 | 11/1965 | Germany | 8/158 |
| 53-103664 | 9/1978 | Japan | 68/12.05 |
| 3-63097 | 3/1991 | Japan | 68/12.02 |
| 1 468 870 | 3/1977 | United Kingdom . | |
| 2 029 863 | 3/1980 | United Kingdom . | |

*Primary Examiner*—Frankie L. Stinson
*Attorney, Agent, or Firm*—Zarley, McKee, Thomte, Voorhees & Sease

[57] ABSTRACT

An air dome and air pressure sensor of the present invention are adapted to determine the level of water in a wash tub. The air dome is located within the wash tub and positioned such that water left in the sump will not enter and remain trapped in the air dome when the washing machine is tilted. The air dome may be comprised of an angled tube having a downward facing open end and being in communication with a pressure sensor via an air dome hose. The angled tube extends downward into the drain tube of the washing machine in such a way that water will not enter and be trapped in the air dome. The air dome may also be comprised of a downward facing air trap in communication with the air pressure sensor via an air dome hose. The air trap is also located within the wash tub and oriented so that water will not enter and be trapped in the air dome when the washing machine is tilted.

24 Claims, 5 Drawing Sheets

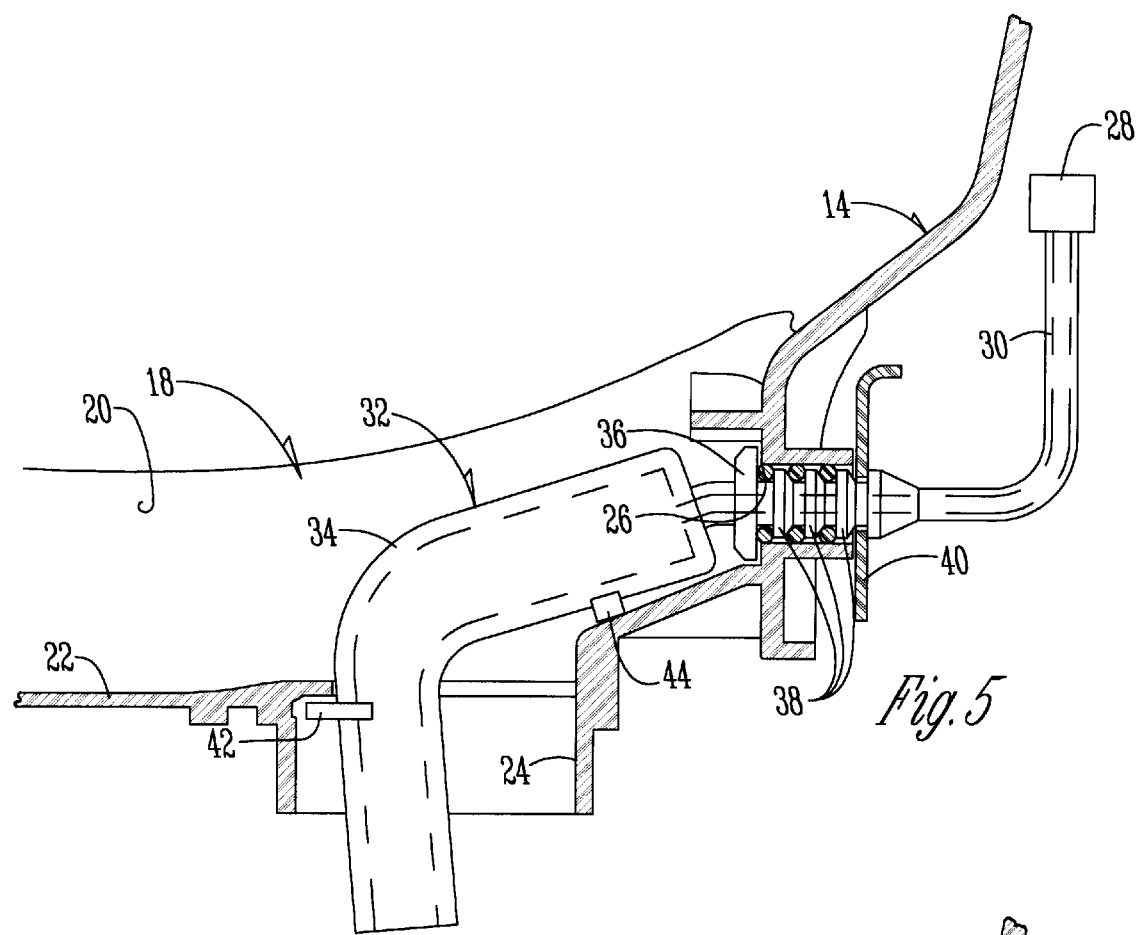
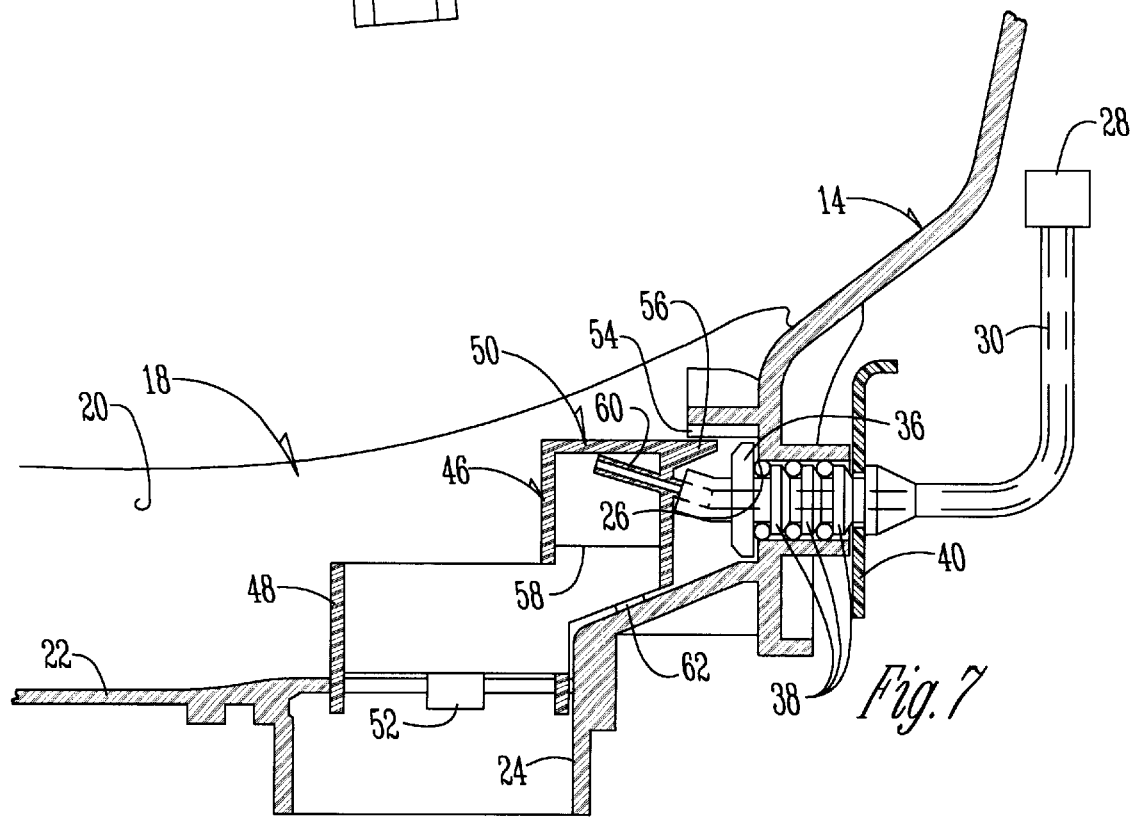

AIR DOME HOSE

BACKGROUND OF THE INVENTION

1. Field of the Invention

The present invention relates to washing machines. More particularly, though not exclusively, the present invention relates to a method and apparatus for controlling the liquid level in a washing machine.

2. Problems in the Art

A typical prior art washing machine controls the fill level by use of an air dome. A typical prior art air dome includes a pressure switch in communication with a sealed tube. The open end of the tube is in communication with the bottom of the wash tub and extends upward toward the pressure switch. As water enters the wash tub and the sump, water will partially enter the opening of the air dome hose and, as the water level rises, the air pressure in the sealed tube increases and ultimately trips the pressure switch. When the pressure switch trips, the washing machine stops filling. One example of a typical air dome is disclosed in U.S. Pat. No. 3,397,716 which is incorporated by reference herein. The air dome described above does not form a part of the present invention.

One major problem with prior art air domes occurs when water is allowed to enter the air dome hose. When this happens, the fill level of the washing machine increases since a greater fill level is required to trip the pressure switch. When water does enter the air dome hose the water does not always come out due to the vacuum caused by the sealed hose. This is similar to placing a finger on the end of a straw to trap liquid in the straw. The fill level required to trip the pressure sensor will increase by an amount equal to the length of the water column trapped in the air dome hose. In other words, if six inches of water are trapped in the air dome hose, the level at which the washing machine will quit filling is increased by six inches. It is possible that the increased fill level will cause the washing machine to overflow.

A common way that water becomes trapped in the air dome hose is when a small amount of water is left in the sump at the bottom of the wash tub. When the washing machine is tipped, for moving or maintenance for example, water will flow into the hose and will not come out. When this happens, the next time the washing machine is filled, the water level required to trip the pressure switch will be greater by an amount equal to the amount of water trapped in the air dome hose.

The prior art teaches to position the air dome outside of the wash tub because of the effects of varying water temperatures. If the air dome is within the wash tub, the temperature of the water will affect the temperature of the air in the air dome. For example, if the water is hot, the air in the air dome will heat and expand, changing the amount of water required to trip the pressure sensor. The prior art therefore teaches away from locating locate the air dome anywhere but outside of the wash tub.

FEATURES OF THE INVENTION

A general feature of the present invention is the provision of a method and apparatus for controlling the liquid level in a washing machine which overcomes problems found in the prior art.

A further feature of the present invention is the provision of a method and apparatus for controlling the liquid level in a washing machine which uses an air dome to control the liquid level, and in which the air dome is oriented such that it will not fill with water when the washing machine is tipped.

A further feature of the present invention is the provision of a method and apparatus for controlling the liquid level in a washing machine using an air dome which extends into the wash tub in the proximity of the sump.

Further features, objects, and advantages of the present invention include:

A method and apparatus for controlling the liquid level in a washing machine which is suitable for use with a horizontal axis washing machine.

A method and apparatus for controlling the liquid level in a washing machine which uses an air dome having a lower end with an enlarged cross section for reducing the effects of changing water temperatures.

A method and apparatus for controlling the liquid level in a washing machine which uses an air dome which is oriented such that water is channeled past the air dome no matter which direction the machine is tipped.

A method and apparatus for controlling the liquid level in a washing machine which uses an air dome which is used as an air trap around the outlet of the tub for detecting water level and a collar assembly.

A method and apparatus for controlling the liquid level in a washing machine using an air dome which is positioned inside of the wash tub.

These as well as other features, objects, and advantages of the present invention will become apparent from the following specification and claims.

SUMMARY OF THE INVENTION

The air dome of the present invention is used in a washing machine to determine a level of water in the wash tub. The invention is comprised of an air dome and an air pressure sensor for measuring the air pressure in the air dome, and determining the level of water in the wash tub. The air dome is oriented such that when the washing machine is tilted, water will not enter and be trapped inside the air dome.

The present invention may optionally include a downward facing angled tube extending into the drain tube of the washing machine. The air dome may also optionally be comprised of a downward facing air trap secured to the wash tub and spaced away from the sides of the wash tub.

BRIEF DESCRIPTION OF THE DRAWINGS

FIG. 5 is a sectional view taken along line 5—5 of FIG. 4.

FIG. 7 is a sectional view taken along line 7—7 of FIG. 6.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalencies which may be included within the spirit and scope of the invention.

Figure 1:
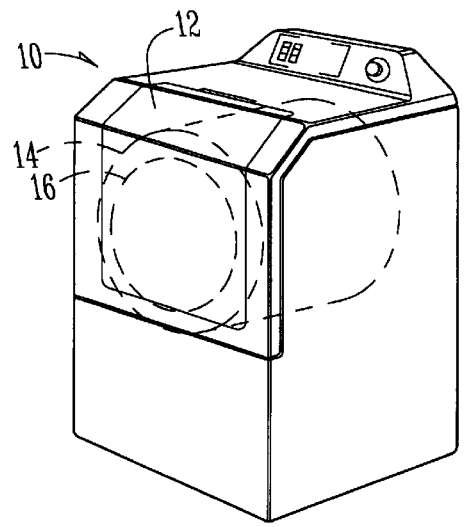
FIG. 1 is a perspective view of a washing machine of the present invention.

FIG. 1 is a perspective view of a washing machine 10 of the present invention. The washing machine 10 shown in FIG. 1 is a horizontal axis washing machine. As shown, the washing machine 10 includes a door 12 which provides access to the interior of the washing machine 10. Disposed within the washing machine 10 is an outer wash tub 14 which surrounds a perforated wash basket 16. During operation, the outer wash tub 14 is stationary while the perforated basket 16 is allowed to rotate or agitate as needed. The components of the washing machine 10 shown in FIG. 1 are not a part of the present invention.

Figure 2:
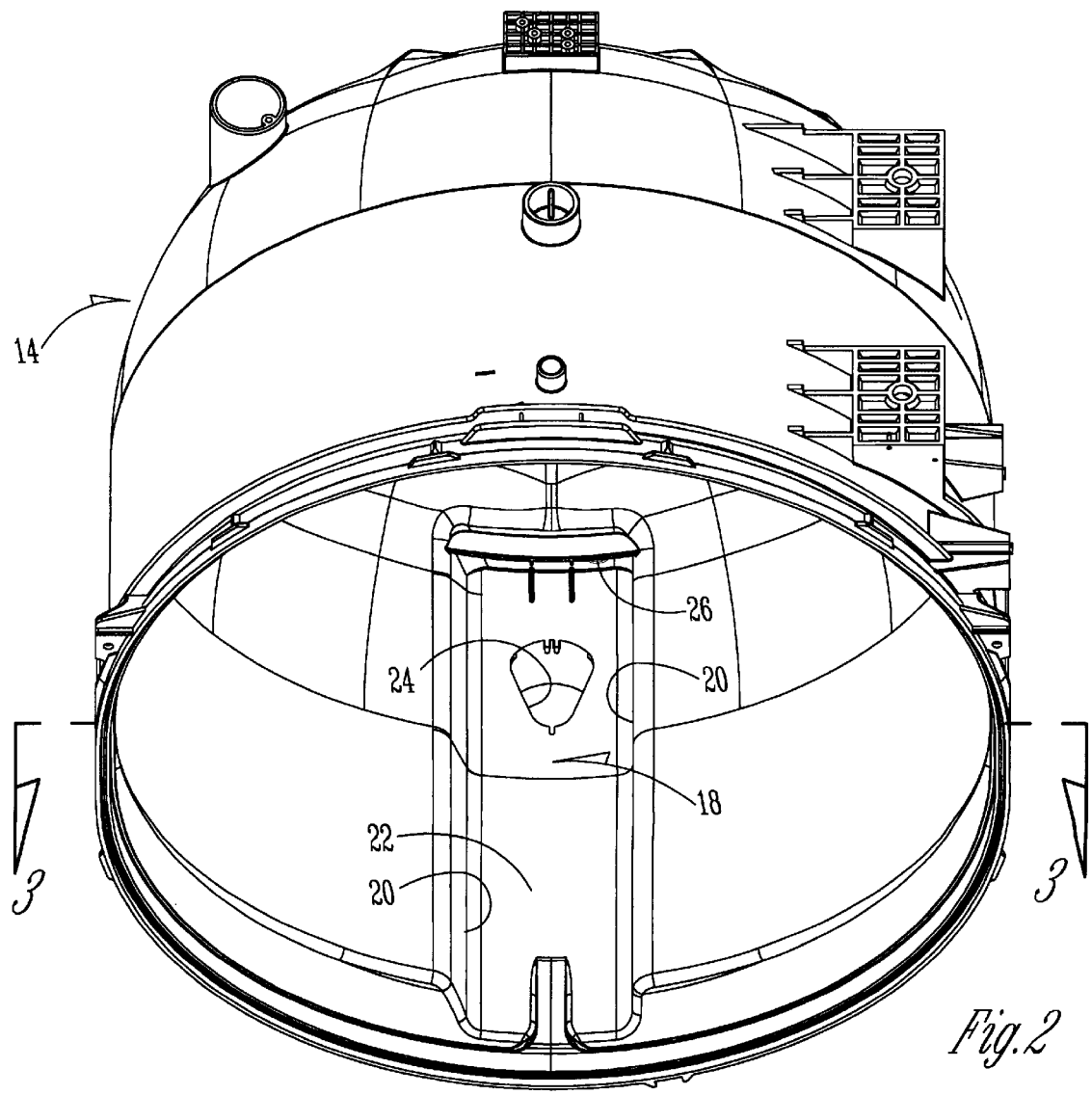
FIG. 2 is a perspective view of a wash tub used with the present invention.
Figure 3:
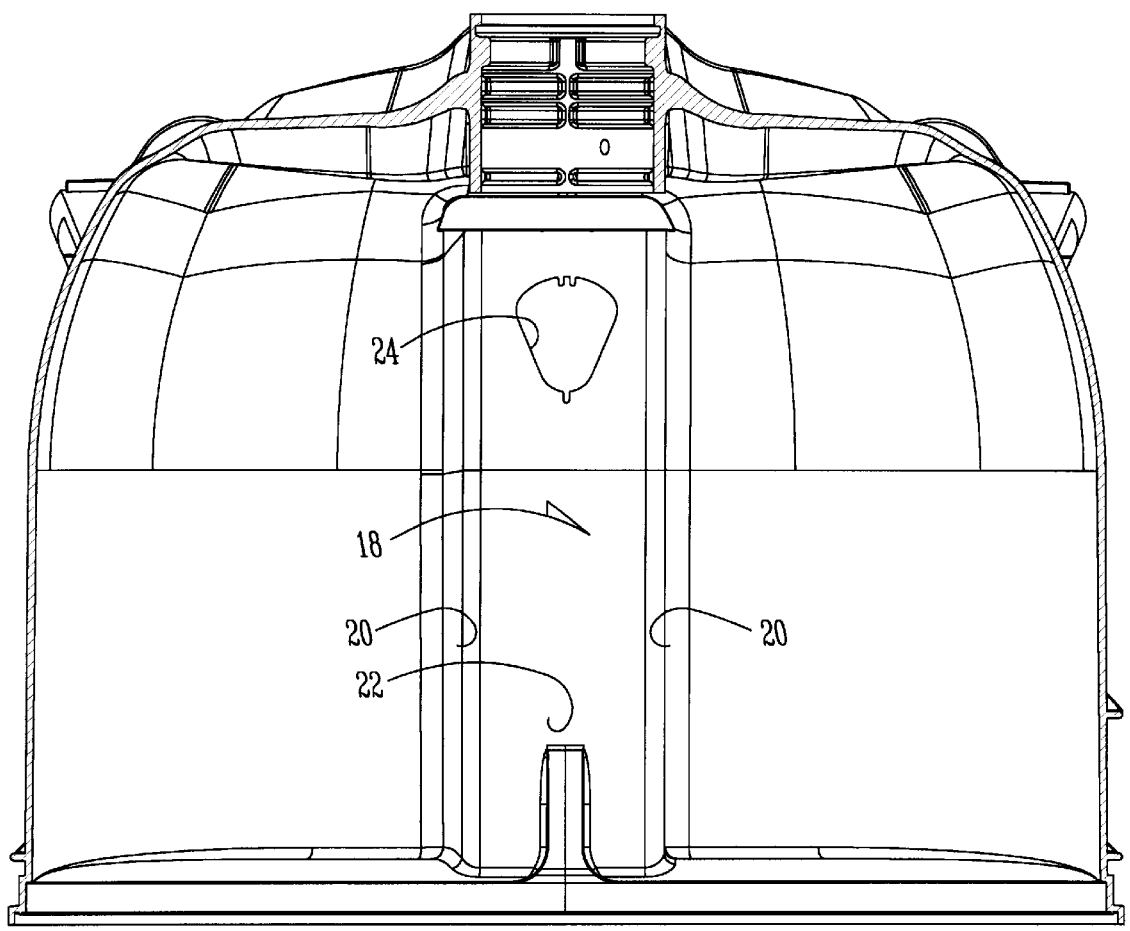
FIG. 3 is a top sectional view of the wash tub shown in FIG. 2 taken along line 3—3 of FIG. 1.

FIG. 2 is a perspective view of the wash tub 14 shown in FIG. 1. FIG. 2 shows the wash tub 14 removed from the washing machine 10 and looking downward inside the wash tub 14. FIG. 3 is a sectional view from the top of the wash tub 14. Formed at the bottom of the wash tub 14 is a sump 18 which is formed by a plurality of downwardly extending walls 20 and a bottom surface 22. As shown, the bottom surface 22 is at a lower position than the remainder of the wash tub 14 so that the water within the wash tub 14 will drain downward and collect in the area of the sump 18.

A drain opening 24 is formed in the bottom surface 22 of the sump 18. Located below the drain opening 24 is a drain outlet hose and drain pump (not shown) which are used to drain water from the wash tub 14 to a drain. Also shown in FIG. 2 is a spout 26 which is described in more detail below.

Figure 4:
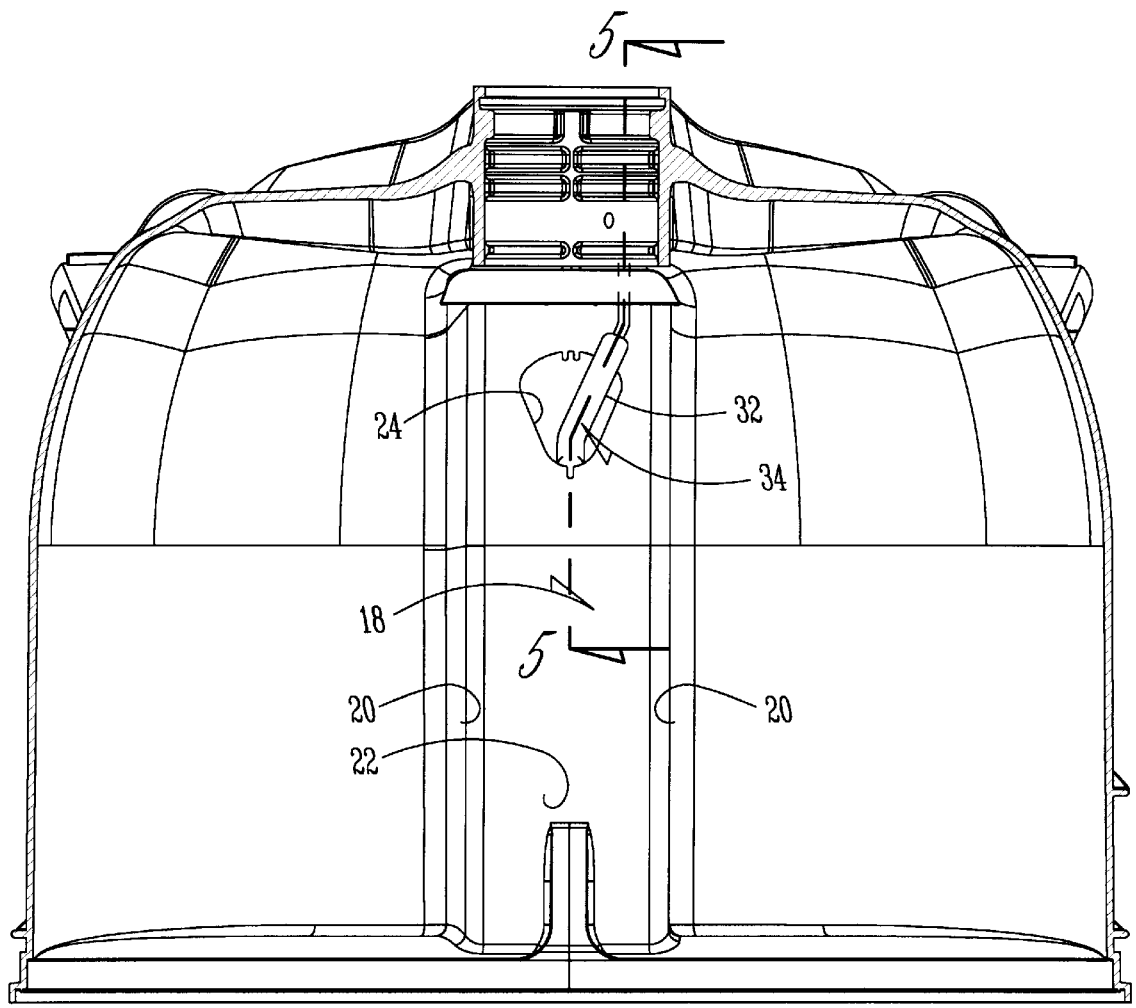
FIG. 4 shows the wash tub of FIG. 3 used with a first embodiment of the present invention.

The present invention uses an air dome and a pressure sensor to control the liquid level in the wash tub 14 of the washing machine 10. FIGS. 4 and 5 show a first embodiment of the air dome of the present invention. FIG. 5 shows diagramatically a pressure sensor 28 and a tube 30 extending from the sensor 28 to the spout 26 as shown. The pressure sensor 28 is preferably comprised of a diaphragm that makes and breaks electrical contract with variations in pressure. The tube 30 is sealed at the end in communication with the sensor 28.

Disposed within the sump area 18 is the air dome 32 which is comprised of a generally L-shaped rubber tube 34 and a fitting 36 which is adapted to engage the spout 26. While the tube 34 preferably has a round cross-section, the cross-sectional shape of the tube may be square, or any other shape. The fitting 36 is held in place and sealed by a plurality of grommets 38 and can be secured by a clip 40 if desired. As shown, the L-shaped tube 34 is in communication with the sensor 28 via the fitting 36 and tube 30. As a result, any change in air pressure in the air dome 32 will be sensed by the sensor 28.

Secured to the L-shaped tube 34 are a pair of positioning tabs 42 and 44. The positioning tabs 42 and 44 help to properly orient the air dome 32 relative to the wash tub 14. As the wash tub 14 is filled with water, the water will fill over and around the air dome 32 causing increasing pressure to the air within the air dome 32. When the air pressure is great enough, the sensor 28 will trip and the washing machine 10 will stop filling.

One important feature of the present invention is that with water left in the sump 18, the washing machine 10 can be tipped without water entering the air dome 32. For example, if the washing machine 10 is tilted toward the front of the washing machine 10, the water will flow to the front of the washing machine before it would flow into the tube 34. Similarly, if the washing machine 10 is tipped in the opposite direction, the water will flow to the back of the wash tub 14, or to the right as shown in FIG. 5, before the water will flow into the tube 34. If the washing machine 10 is tilted to either side, the tube 34 would also not be filled with water. As a result, the washing machine 10 can be tipped in any direction without the air dome 32 filling with water and causing the overfill problems described above.

Again, the prior art teaches that the air dome of a washing machine should not be placed within the wash tub since the change in temperature can affect the accuracy of the sensor 28. Since the present invention uses an air dome which is placed within the wash tub 14, this problem must be solved. To help compensate for this problem, the L-shaped tube 34 has an increased diameter as compared to the tube 30 or a prior art air dome. As a result, the change in temperature of the air within the air dome 32 will have significantly less impact on the pressure sensed at the sensor 28. In addition, the increased diameter of the tube 34 also helps to prevent water from being retained within in the tube 34.

Figure 6:
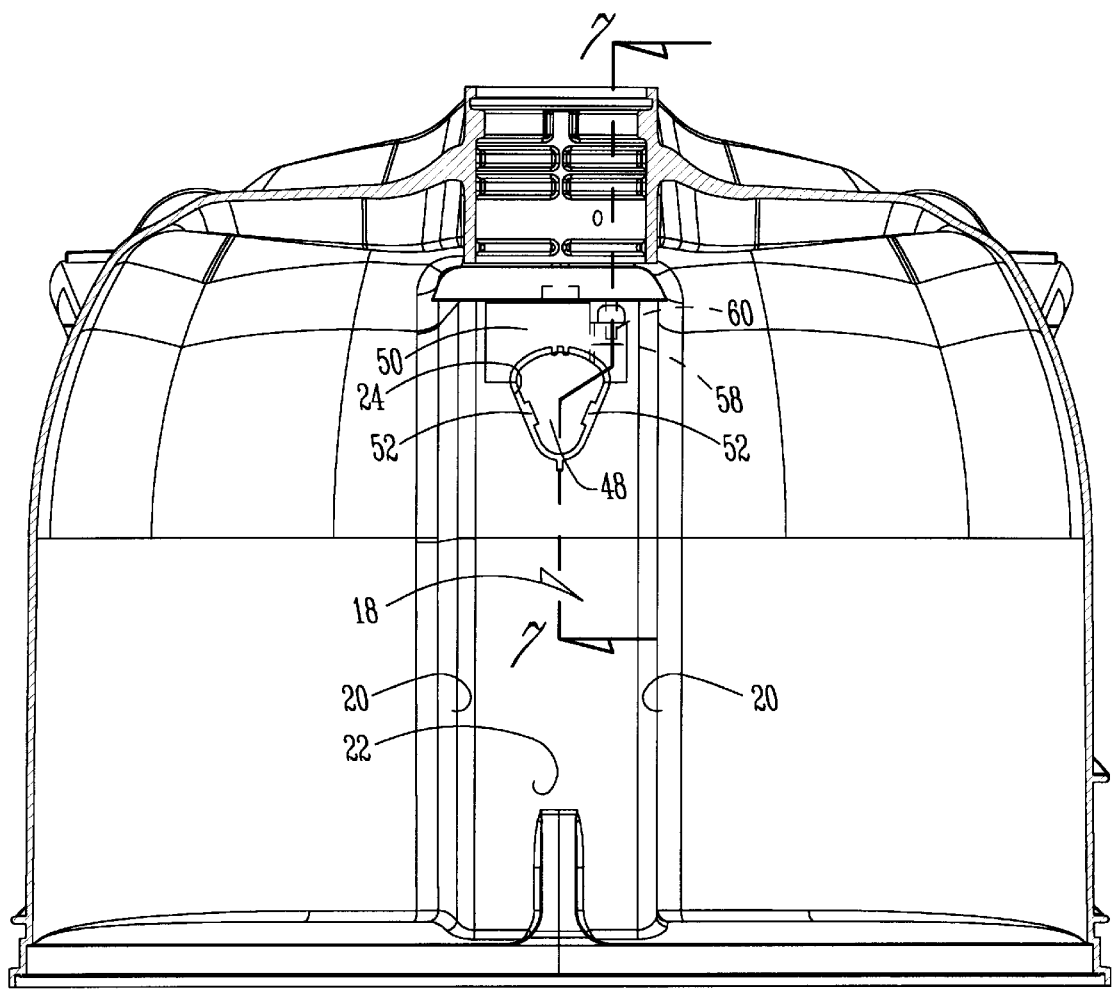
FIG. 6 shows the wash tub of FIG. 3 used with a second embodiment of the present invention.

FIGS. 6 and 7 are analogous to FIGS. 4 and 5 described above except show an alternative embodiment of the present invention. In this alternative embodiment, the air dome 32 is replaced by a rigid plastic air dome 46. The air dome 46 includes a collar 48 which extends around the periphery of the opening 24 formed in the sump 18. The air dome 46 also includes a downward facing air trap 50 which remains filled with air even after the wash tub 14 is filled with water.

The collar 48 is used to keep the detergent that is dispensed into the washing machine 10 from draining into the outlet hose via the opening 24 before the detergent is diluted and used to clean the clothing in the washing machine 10. The collar 48 also prevents dense items such as nails, coins, and wires from exiting the wash tub 14 and blocking the pump. The air dome 46 shown in FIGS. 6 and 7 is designed with a large cross sectional area to volume ratio. This large area to volume ratio helps to eliminate trip level inaccuracies which can be caused by the thermal expansion and contraction of air as hot and cold water is used in the washing machine 10. Without the large cross sectional area to volume ratio, a fill variation of up to 1.5 gallons may result from a fill water temperature change of 70°. In contrast, the present invention has an accuracy of approximately 0.2 gallons, regardless of temperature.

The air dome 46 is rigidly fastened to eliminate fill variations caused by dome motion or assembly orientation variations. The air dome 46 is secured to the wash tub 14 by two tabs 52 which extend downward and engage the bottom surface 22 of the sump 18 around the drain opening 24 to snap the air dome 46 into place. A flange 54 is received within a channel 56 formed in the wash tub 14. The flange 54 helps to position the air dome 46 vertically, side to side, and prevent backward movement. Within the air trap 50 is a wall 58 which divides the air trap 50, as shown best in FIG. 6. Within the smaller portion of the air trap 50, an outlet nozzle 60 is formed which extends through the air trap 50. The fitting 36 is inserted over the opposite end of the nozzle 60 so that the air trap 50 becomes in communication with the pressure sensor 28 via the nozzle 60, fitting 36, and tube 30.

The air dome 46 allows the washing machine 10 to have water remaining in the sump 18 and be tilted in any direction without causing the air dome hose to fill with water causing an overfill during the next fill. The air dome 46 is spaced away from adjacent walls of the wash tub 14 allowing the water to drain away from the air dome 46 when the washing machine 10 is tipped.

The air dome 46 includes several slots 62 formed along the bottom edge of the air trap 50. The slots 62 dampen the flow of water before the dome 46 is sealed off by the water. This causes turbulent water to become more stable. The water level inside the air dome 46 will rise in a more stable condition allowing the air trap 50 to trap the same volume of air every cycle regardless of tumble direction, fill rate, or tub motion, etc. The slots 62 also prevent large debris from sealing on the bottom of the air dome 46.

The present invention operates as follows. The operation of the embodiment shown in FIGS. 4 and 5 will be discussed first. At the beginning of a wash cycle, the wash tub 14 will begin filling with water. As the wash tub 14 fills with water, the water fills the sump 18 and surround the air dome 32. As the water level increases, the pressure of the air inside the air dome 32 will increase in proportion to the level of water. When the air pressure becomes great enough, the pressure sensor 28 will trip causing the washing machine 10 to stop filling. In this way, the washing machine is filled to a desired level. At the end of a wash cycle, the water will drain until only a small amount of water is left in the sump 18. Before the next wash cycle, if the washing machine 10 is tipped in any direction, the water will be directed away from the opening in the L-shaped tube 34, preventing the air dome 32 from filling with water which would result in overfilling during the next wash cycle.

The embodiment illustrated in FIGS. 6 and 7 operates in a similar manner. At the beginning of a wash cycle, the wash tub 14 will begin filling with water. Since the collar 48 surrounds the drain opening 24, the collar 48 will slow the flow of water into the drain opening 24 until the water level exceeds that of the collar 48. As the water level increases, the air dome 46 will be covered with water trapping a pocket of air in the air trap 50. As the water level increases, the air pressure in the air dome 46 will correspondingly increase. Once the air pressure reaches a threshold value, the pressure sensor 28 will trip, stopping the fill of water into the wash tub 14. At the end of the wash cycle, the wash tub 14 will drain with a small amount of water left in the sump 18. If the washing machine 10 is subsequently tipped in any direction, the water will be directed away from the nozzle 60 and therefore will not fill with water.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A device for controlling water level in a washing machine having a wash tub and a sump formed in the tub comprising:

an air pressure sensor for measuring the air pressure in order to determine the level of water in the tub; and an air dome disposed within the wash tub, the air dome being in communication with the air pressure sensor so that the air pressure sensor can sense the air pressure in the air dome, wherein the air dome is oriented such that water will not fill the air dome when the washing machine is tilted.

2. The device of claim 1 further comprising an air dome hose having an upper and lower end, the upper end being in communication with the air pressure sensor, the lower end being in communication with the air dome.

3. The device of claim 1 wherein the air dome further comprises an L-shaped tube being open at one end and being in communication with the air pressure sensor at the opposite end.

4. The device of claim 3 wherein the open end of the L-shaped tube is located in the sump of the washing machine and faces downward.

5. The device of claim 3 further comprising a drain tube in communication with the sump for draining water from the sump, wherein the open end of the L-shaped tube extends downward into the drain tube.

6. The device of claim 3 further comprising an air dome hose connected between the air pressure sensor and the L-shaped tube, wherein the diameter of the L-shaped tube is substantially greater than the diameter of the air dome hose.

7. The device of claim 1 wherein the air dome is spaced from the walls of the wash tub.

8. The device of claim 1 wherein the air dome comprises a downward facing air trap positioned in the sump of the washing machine.

9. The device of claim 8 further comprising an air dome hose connected between the pressure sensor and the air trap.

10. The device of claim 9 further comprising a tube extending into the air trap and being in communication with the air dome hose.

11. The device of claim 10, wherein the air trap has a plurality of sides and a top, wherein the tube extends into the air trap in the proximity of the top of the air trap and away from the sides of the air trap.

12. The device of claim 8 wherein the air trap includes a plurality of sides having bottom edges, wherein a plurality of notches are formed along the bottom edges of the sides.

13. The device of claim 8 further comprising a drain outlet tube formed in the bottom of the sump, wherein the air dome further comprises a collar extending around the edges of the drain tube.

14. The device of claim 1 wherein the washing machine is comprised of a horizontal axis washing machine.

15. A method for controlling water level in a washing machine having a wash tub and a sump formed in the tub comprising the steps of:

providing an air pressure sensor coupled to the washing machine;

providing an air dome in communication with the air pressure sensor;

positioning the air dome at least partially within the wash tub in the proximity of the sump such that water in the wash tub affects the air pressure in the air dome, wherein the air dome is positioned in the wash tub such that water within the wash tub and sump will be channeled away from the air dome when the washing machine is tipped so that the air dome does not fill with water; and sensing the air pressure in the air dome to provide an indication of the level of water in the wash tub.

16. The method of claim 15 wherein the wash tub includes a plurality of sides, wherein the air dome is positioned at least partially within the wash tub such that the air dome is spaced from the plurality of sides.

17. The method of claim 15 wherein the air dome includes an open end, wherein the air dome is positioned with the open end facing downward.

18. The method of claim 15 wherein the air dome provided includes an angled tube having a first open end and a second end in communication with the air pressure sensor.

19. The method of claim 18 wherein the angled tube is positioned in the sump of the washing machine such that the open end is facing downward.

20. The method of claim 18 wherein the washing machine further comprises a drain tube in communication with the sump of the wash tub for draining water from the wash tub, wherein the angled tube is positioned with the open end of the angled tube extending into the drain tube.

21. The method of claim 18 further comprising the step of providing an air dome hose connected between the air pressure sensor and the air dome, wherein the diameter of the air dome hose is substantially less that the diameter of the angled tube.

22. The method of claim 15 wherein the air dome is provided with a plurality of sides and a top surface forming an air trap.

23. The method of claim 22 wherein the air trap is positioned at least partially within the sump with the sides and top forming a downward facing chamber.

24. The method of claim 23 further comprising the step of providing a hose in communication with the air pressure sensor and the downward facing chamber.

* * * * *